(12) United States Patent
Cosovic

(10) Patent No.: US 7,974,354 B2
(45) Date of Patent: Jul. 5, 2011

(54) PEAK-TO-AVERAGE-POWER-RATIO REDUCTION IN COMMUNICATION SYSTEMS

(75) Inventor: Ivan Cosovic, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 946 days.

(21) Appl. No.: 11/901,392

(22) Filed: Sep. 17, 2007

(65) Prior Publication Data

US 2008/0069254 A1 Mar. 20, 2008

(30) Foreign Application Priority Data

Sep. 15, 2006 (EP) .................................... 06019360

(51) Int. Cl.
*H04L 27/28* (2006.01)
(52) U.S. Cl. ........................ 375/260; 375/267
(58) Field of Classification Search .................. 375/260, 375/295, 267; 370/208–210
See application file for complete search history.

(56) References Cited

U.S. PATENT DOCUMENTS

| 7,583,738 | B2 * | 9/2009 | Yun et al. | 375/260 |
|---|---|---|---|---|
| 7,664,192 | B2 * | 2/2010 | Yun et al. | 375/267 |
| 7,675,986 | B1 * | 3/2010 | Nergis | 375/260 |
| 2007/0116142 | A1 * | 5/2007 | Molander | 375/260 |
| 2007/0121483 | A1 * | 5/2007 | Zhang et al. | 370/208 |

OTHER PUBLICATIONS

Office Action dated Mar. 6, 2009.
Saul, "Generalized Active Constellation Extension for Peak Reduction in OFDM Systems," IEEE, pp. 1974-1979 (2005).
European Search Report dated Feb. 22, 2007.
Aggarwal, et al., "Minimizing the Peak-to-Average Power Ratio of OFDM Signals via Convex Optimization," IEEE, GLOBECOM pp. 2385-2389 (2003).
Krongold, "An Active-Set Approach for OFDM PAR Reduction via Tone Reservation," IEEE Transactions on Signal Processing, 52:495-509 (2004).
3rd Generation Partnership Project; Technical Specification Group Radio Access Network; Physical layer aspects for evolved Universal Terrestrial Radio Access (UTRA) (Release 7), 3GPP TR 25.814 V7.0.0 (Jun. 2006).
A.E. Jones, T.A. Wilkinson and S.K. Barton, "Block coding scheme for reduction of peak to mean envelope power ratio of multicarrier transmission schemes," Electronics Letters, vol. 30, No. 25 (Dec. 8, 1994), pp. 2098-2099.
B.S. Krongold and D.L. Jones, "PAR Reduction in OFDM via Active Constellation Extension," IEEE Transactions on Broadcasting, vol. 49, No. 3 (Sep. 2003), pp. 258-268.
X. Li and L.J. Cimini, Jr., "Effects of Clipping and Filtering on the Performance of OFDM," IEEE Communications Letters, vol. 2, No. 5 (May 1998), pp. 131-133.

(Continued)

*Primary Examiner* — Emmanuel Bayard
(74) *Attorney, Agent, or Firm* — Nutter McClennen & Fish LLP; John J. Penny, Jr.

(57) ABSTRACT

An adaptation apparatus for adapting an input signal, the input signal being digital in the frequency domain and having a peak-to-average-power-ratio in the time domain. The adaptation apparatus has an evaluation unit for evaluating the input signal and for providing an evaluation signal based on an optimization criterion. The adaptation apparatus further has a summing unit for adding the evaluation signal to the input signal in the frequency domain and for providing an output signal in the frequency domain having a lower peak-to-average-power-ratio in the time domain than the signal in the time domain.

12 Claims, 8 Drawing Sheets

OTHER PUBLICATIONS

S.H. Muller and J.B. Huber, "A Comparison of Peak Power Reduction Schemes for OFDM," Universitat Erlangen-Nurnberg, Erlangen, Germany, © 1997 IEEE (0-7803-4198-8/97), pp. 1-5.

R. O'Neill and L.B. Lopes, "Envelope Variations and Spectral Splatter in Clipped Multicarrier Signals," University of Leeds, Leeds, United Kingdom, © 1995 IEEE (0-7803-3002-1/95), pp. 71-75.

S.H. Han, Stanford Univerity, J.H. Lee, Seoul National Univerity, "An Overview of Peak-to-Average Power Ratio Reduction Techniques for Multicarrier Transmission," IEEE Wireless Communications (Apr. 2005), pp. 56-65.

G.R. Hill, M. Faulkner and J. Singh, "Reducing the peak-to-average power ratio in OFDM by cyclically shifting partial transmit sequences," Electronics Letters, vol. 36, No. 6 (Mar. 16, 2000), pp. 560-561.

* cited by examiner

PEAK-TO-AVERAGE-POWER-RATIO REDUCTION IN COMMUNICATION SYSTEMS

CROSS-REFERENCE TO RELATED APPLICATIONS

This application claims priority from European Patent Application No. 06019360.4, which was filed on Sep. 15, 2006, and is incorporated herein by reference in its entirety.

TECHNICAL FIELD

The present invention relates to the field of peak-to-average-power-ratio reduction in wireless communication systems, where low peak-to-average-power-ratios are desired in order to take advantage of the linear characteristics of power amplifiers and in order to avoid inter-modulation products caused by non linear power amplifier characteristics. More specifically, the present invention relates to peak-to-average-power-ratio reduction as necessary in future mobile communication systems, as for example in orthogonal frequency division multiplexing (OFDM) systems or generally systems, which are based on multi-carrier (MC) modulation.

BACKGROUND

A high peak-to-average-power-ratio of a transmit signal is one of the greatest problems of multi-carrier systems, for example, orthogonal frequency division multiplexing (OFDM) or discrete multi-tone (DMT) systems. High peak values drive non-linear power amplifiers during operation in non-linear regions of their amplifying characteristics. Amplifiers being operated in non-linear regions of their characteristics cause inter-modulation products, modulations among sub carriers and out of band radiation. To prevent these effects a power amplifier must be operated in the linear region of its characteristics introducing large input back-offs for the case of higher peaks being present. The problem of higher peak-to-average-power ratios can, in some applications, even compensate or annul the benefits of multi-carrier modulations. Hence, the reduction of the peak-to-average-power-ratio is an essential topic in multi-carrier systems.

A number of techniques has been proposed to deal with the problem of high peak-to-average-power ratios in orthogonal frequency division multiplexing. The following list provides a summary of the state of the art concepts:

G. R. Hill, M. Faulkner, and J. Singh, "Reducing the Peak-to-Average Power Ratio in OFDM by Cyclically Shifting Partial Transmit Sequences," Elect. Lett., vol. 36, no. 6, March 2000, pp. 560-561.

A. E. Jones, T. A. Wilkinson, and S. K. Barton, "Block Coding Scheme for Reduction of Peak to Mean Envelope Power Ratio of Multicarrier Transmission Scheme," Elect. Lett., vol. 30, no. 22, December 1994, pp. 2098-2099.

B. S. Krongold and D. L. Jones, "PAR Reduction in OFDM via Active Constellation Extension," IEEE Trans. Broadcast., vol. 49, no. 3, September 2003, pp. 258-268.

X. Li and L. J. Cimini, Jr., "Effect of Clipping and Filtering on the Performance of OFDM," IEEE Commun. Lett., vol. 2, no. 5, May 1998, pp. 131-133.

S. H. Müller and J. B. Huber, "OFDM with Reduced Peak-to-Average Power Ratio by Optimum Combination of Partial Transmit Sequences," Elect. Lett., vol. 33, no. 5, February 1997, pp. 368-369.

S. H. Müller and J. B. Huber, "A Comparison of Peak Power Reduction Schemes for OFDM," Proc. IEEE GLOBECOM '97, Phoenix, Ariz., November 1997, pp. 1-5.

R. O'Neill and L. B. Lopes, "Envelope Variations and Spectral Splatter in Clipped Multicarrier Signals," Proc. IEEE PIMRC '95, Toronto, Canada, September 1995, pp. 71-75.

J. Tellado, Peak-to-average-power Reduction for Multi-carrier Modulation, Ph.D. dissertation, Stanford Univ., 2000.

A comprehensive overview of the above-mentioned techniques including some further references can be found in, S. Hee Han and J. Hong Lee, "An Overview of Peak-to-Average Power Ratio Reduction Techniques for Multi-carrier Transmission", IEEE Wireless Communications, April 2005, pp. 56-65.

One of the most promising solutions is the tone reservation method. In this method, several sub-carriers are reserved for transmission of peak-to-average-power-ratio reduction tones. The peak-to-average-power-ratio reduction tones are determined so as to minimize the peak-to-average-power-ratio of the original transmission signal. Although the corresponding peak-to-average-power-ratio reduction results are promising, this method suffers from loss in spectral efficiency due to the reservation of exclusive tones for the purposes of peak-to-average-power-ratio reduction. In addition, power efficiency is reduced as part of the transmit power is invested not into data sub-carriers, but on peak-to-average-power-ratio reduction sub-carriers. The tone reservation method is currently under consideration by the third generation partnership project (3GPP) within their technical specification group radio access network as one of the physical layer aspects for evolved Universal Terrestrial Radio Access (UTRA), cf. $3^{rd}$ Generation Partnership Project (3GPP), "Physical layer aspect for evolved Universal Terrestrial Radio Access (UTRA)", June 2006.

SUMMARY

According to an embodiment, an adaptation apparatus for adapting an input signal, the input signal being digital in the frequency domain having complex modulation symbols and having a peak-to-average-power-ratio in the time domain, may have: an evaluation unit for evaluating the input signal and for providing an evaluation signal having complex symbols based on an optimization criterion having a sub-criterion such that the value range of the symbols of the evaluation signal is constrained; and a summing unit for adding the evaluation signal to the input signal in the frequency domain and for providing an output signal in the frequency domain having a lower peak-to-average-power-ratio in the time domain than the input signal in the time domain.

According to another embodiment, a method for adapting an input signal, the input signal being digital in the frequency domain having complex modulation symbols and having a peak-to-average-ratio in the time domain, may have the steps of: evaluating the input signal and providing an evaluation signal having complex symbols based on an optimization criterion having a sub-criterion such that the value range of the symbols of the evaluation signal is constrained; adding the evaluation signal to the input signal in the frequency domain; and providing an output signal in the frequency domain having a lower peak-to-average-power-ratio in the time domain than the input signal in the time domain.

An embodiment may have a computer program having a program code for performing the above-mentioned method, when a program code runs on a computer.

Embodiments of the present invention are based on the finding that an optimization algorithm can be used to find an evaluation signal, which is added to the input signal, e.g. for orthogonal frequency division multiplexing an addition of a complex valued sequence to the original transmit data sequence is applied in a way that the peak-to-average-power-ratio is minimized. The additive complex valued sequence could for example be determined using an efficient convex optimization algorithm, which includes constraints on transmission power and bit error performance.

An embodiment of the present invention provides the advantage that it necessitates only additional signal processing at the transmitter whereas the receiver remains unchanged. The inventive apparatus and methods outperform other schemes for peak-to-average-power-ratio reduction and can be applied to basically all orthogonal frequency division multiplexing systems, as for example WLAN, DVB-T, 4G systems, etc.

BRIEF DESCRIPTION OF THE DRAWINGS

Embodiments of the present invention will be detailed using the figures attached, in which.

DETAILED DESCRIPTION

Figure 1:
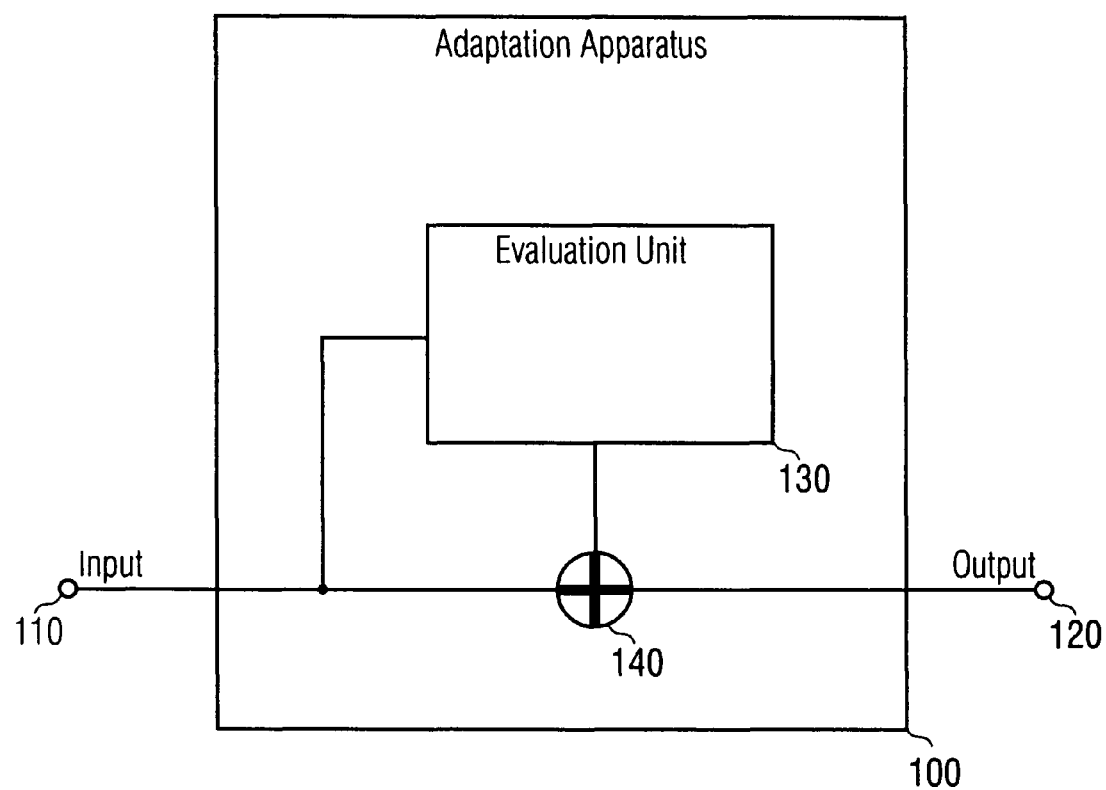
FIG. 1 shows a diagram of an embodiment of the inventive adaptation apparatus.

FIG. 1 shows an embodiment of an adaptation apparatus 100 with a connector 110 for an input signal and a connector 120 for an output signal. In the embodiment displayed in FIG. 1 the adaptation apparatus 100 further comprises an evaluation unit 130 and a summation entity 140. The adaptation apparatus 100 is for adapting an input signal, the input signal being digital in the frequency domain and having a peak-to-average-power-ratio in time domain. The input signal could for example be a signal from a WLAN system, a DVB-T system, or a 4G system. Basically, the input signal can be any multi-carrier signal in the frequency domain.

The adaptation apparatus 100 further comprises the evaluation unit 130 for evaluating the input signal and for providing an evaluation signal based on an optimization criterion. The optimization criterion can comprise several constraints regarding the evaluation signal as for example a power constraint or also a constraint on a bit error rate.

The adaptation apparatus 100 further comprises a summing unit 140 for adding the evaluation signal to the input signal in the frequency domain and for providing the output signal in the frequency domain having a lower peak-to-average-power-ratio in the time domain than the input signal in the time domain.

The proposed technique adds signal-processing units, i.e. the evaluation unit 130 and the summing unit 140 only at the transmitter, whereas a potential receiver remains unchanged. The evaluation signal as a peak-to-average-power ratio-reduction signal is added to a transmission signal and it therewith causes some degradation in the system performance, as the transmission symbols do not coincide with the original symbol constellation any more. However, by introducing proper constraints into the design of the peak-to-average-power-ratio reduction signal degradation can be easily controlled and limited.

In comparison to the tone reservation method, the proposed method exhibits a number of advantages. Assuming the same bit-error-ratio versus signal-to-noise-ratio working point, the proposed method exhibits a lower peak-to-average-power ratio. This is due to the fact that all sub-carriers are exploited for peak-to-average-power-ratio suppression and thus more degrees of freedom are available to find a solution that minimizes the peak-to-average-power-ratio than in the case of the tone reservation method for example.

The proposed method further provides the advantage that no reservations of special sub-carriers for purposes of peak-to-average-power-ratio reduction are necessary and it does thus not reduce the spectral efficiency as for example the tone reservation method.

Figure 2:
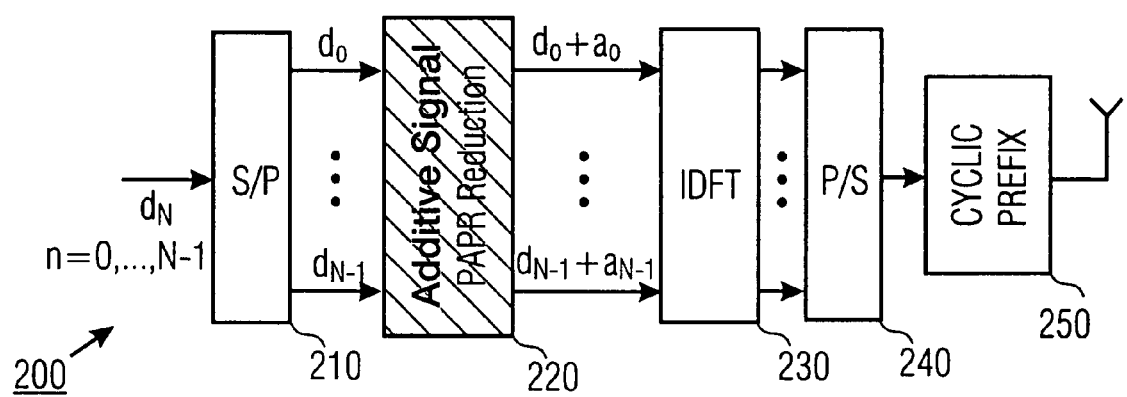
FIG. 2 shows a block diagram of an orthogonal frequency division multiplexing system, wherein an embodiment of an inventive adaptation apparatus is integrated.

FIG. 2 illustrates an orthogonal frequency division multiplexing transmitter 200. The transmitter comprises a serial-to-parallel converter 210, an additive signal entity 220, which is an embodiment of the inventive adaptation apparatus, an inverse discrete Fourier transformation entity 230, a parallel-to-serial converter 240, and a cyclic prefix addition entity 250. An orthogonal frequency division multiplexing system with a total of N sub-carriers is considered. According to the illustration in FIG. 2, the input bits are simply mapped applying phase shift keying or quadrature amplitude modulation and N complex valued data symbols $d_n$, n=0, 1 . . . , N−1, are generated. These symbols are serial-to-parallel converted using the serial-to-parallel converter 210. The output of the serial-to-parallel converter 210 is an N element data symbol array $d=(d_0, d_1, \ldots d_{N-1})^T$, where $(.)^T$ denotes the transposition. The array d is fed into the peak-to-average-power-ratio reduction unit 220, which is an embodiment of the inventive adaptation apparatus. The output of the additive signal peak-to-average-power-ratio reduction unit 220 is another N element symbol array $c=(c_0, c_1, \ldots, c_{N-1})^T$. In this embodiment of the present invention, the peak-to-average-power-ratio reduction unit 220 adds to each symbol $d_n$ a complex valued signal $a_n$. Therefore, the entries of c, i.e. the output of the peak-to-average-power-ratio reduction unit 220, are given by $$c_n = d_n + a_n, \quad n=0, 1, \ldots, N-1. \tag{1}$$

The complex values $a_n$, n=0, 1 . . . N−1, are chosen according to an optimization algorithm by which the peak-to-average-power-ratio of the transmission signal is optimized, and in one embodiment of the present invention the peak-toaverage-power-ratio of the transmission signal is minimized. Finally, the vector c is modulated on N sub-carriers using the inverse discrete Fourier transform entity 230. After that, a parallel-to-serial conversion is performed using the parallel-to-serial converter 240, and a guard interval of length $T_\Delta$ that exceeds the delay spread of the multi-path channel is added as cyclic prefix.

In the following, it will be described how the additive array $$a=(a_0, a_1, \ldots, a_{N-1})^T, a \in C^N, \qquad (2)$$

is designed according to an optimisation criterion by which the peak-to-average-power-ratio is improved, respectively, in one embodiment of the present invention even minimized. The peak-to-average-power-ratio (PAPR) of an OFDM symbol is defined as $$PAPR = \frac{\max_{k=0,1,\ldots N-1} |x_k|^2}{\frac{1}{N}\|x\|^2}, \qquad (3)$$

where $x=(x_0, x_1, \ldots, x_{N-1})^T$ is the transmitted time domain vector obtained after the inverse discrete Fourier transformation of the transmit symbol vector c=d+a. In particular, $$x=Fc=F(d+a) \qquad (4)$$

where F is the N×N matrix with entries $$[F]_{m,p} = \frac{1}{\sqrt{N}} e^{j2\pi mp/N} \qquad (5)$$
$$m = 0, 1, \ldots, N-1,$$
$$p = 0, 1, \ldots, N-1.$$

The factor 1/N in (3) is a scale factor inserted so that the minimum peak-to-average-power-ratio equals 0 dB. To minimize the peak-to-average-power-ratio of the transmission signal x a vector a has to be determined by solving the following optimization problem $$a = \min_{\tilde{a}} \left\{ \frac{\max_{k=0,1,\ldots,N-1} |F_k(d+\tilde{a})|^2}{\frac{1}{N}\|F(d+\tilde{a})\|^2} \right\} \qquad (6)$$

where $\tilde{a}$ is a trial value of a and $F_k$ is the kth row of matrix F.

In one embodiment of the present invention, the vector a has two constraints. The first constraint ensures that the sequence c does not invest more power into the transmission than the original sequence d, i.e.

$$\|d+a\|^2 \leq \|d\|^2. \qquad (7)$$

The second constrain inherently controls the bit error rate (BER) performance and ensures that the elements of a are between pre-defined limits, i.e., $$|a_n| \leq R, n=0, 1, \ldots, N-1. \qquad (8)$$

Figure 3:
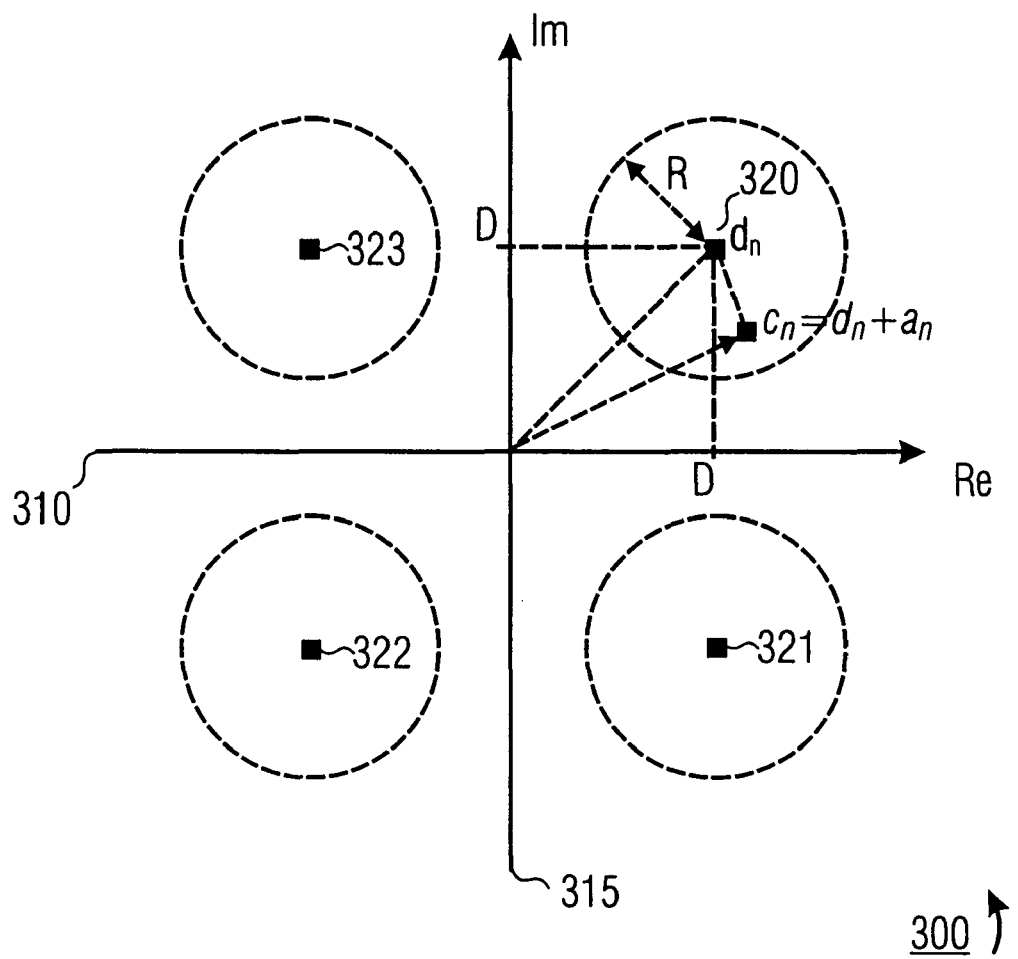
FIG. 3 shows an exemplified constellation diagram for quadrature phase shift keying (QPSK) modulation with circular value range regions for the additive signal.

The effect of the constraint given in equation (8) on the element $c_n$ is illustrated in FIG. 3. FIG. 3 shows a constellation diagram 300 for quadrature phase shift keying (QPSK) modulation. FIG. 3 depicts the complex plane with a real axis 310 and an imaginary axis 315. Furthermore, FIG. 3 shows four modulation symbols 320-323, which all have the same magnitude and are ordered symmetrically to the origin. Taking into account the constraints given in equation (8), one can determine circular regions centered in the modulation symbols 320-323 themselves with the radius of R, wherein the manipulated symbols $c_n$ may happen to occur. As it can be seen from FIG. 3 with the constraint given in equation (8) it is allowed that elements $c_n$ lie only within the circular regions of radius R around the original points $d_n$. Owing to the fact that the resulting points $c_n$ do not coincide with the original points, the bit-error-rate performance is influenced. It can be easily seen from FIG. 3, that when R increases, obviously, it can be expected that the bit-error-ratio also increases as the new points $c_n$ can lie closer to the neighbouring decision regions. On the other hand, when R increases, the constraint given in equation (8) becomes looser enabling to find a better solution to the optimization problem given in equation (6).

Figure 4:
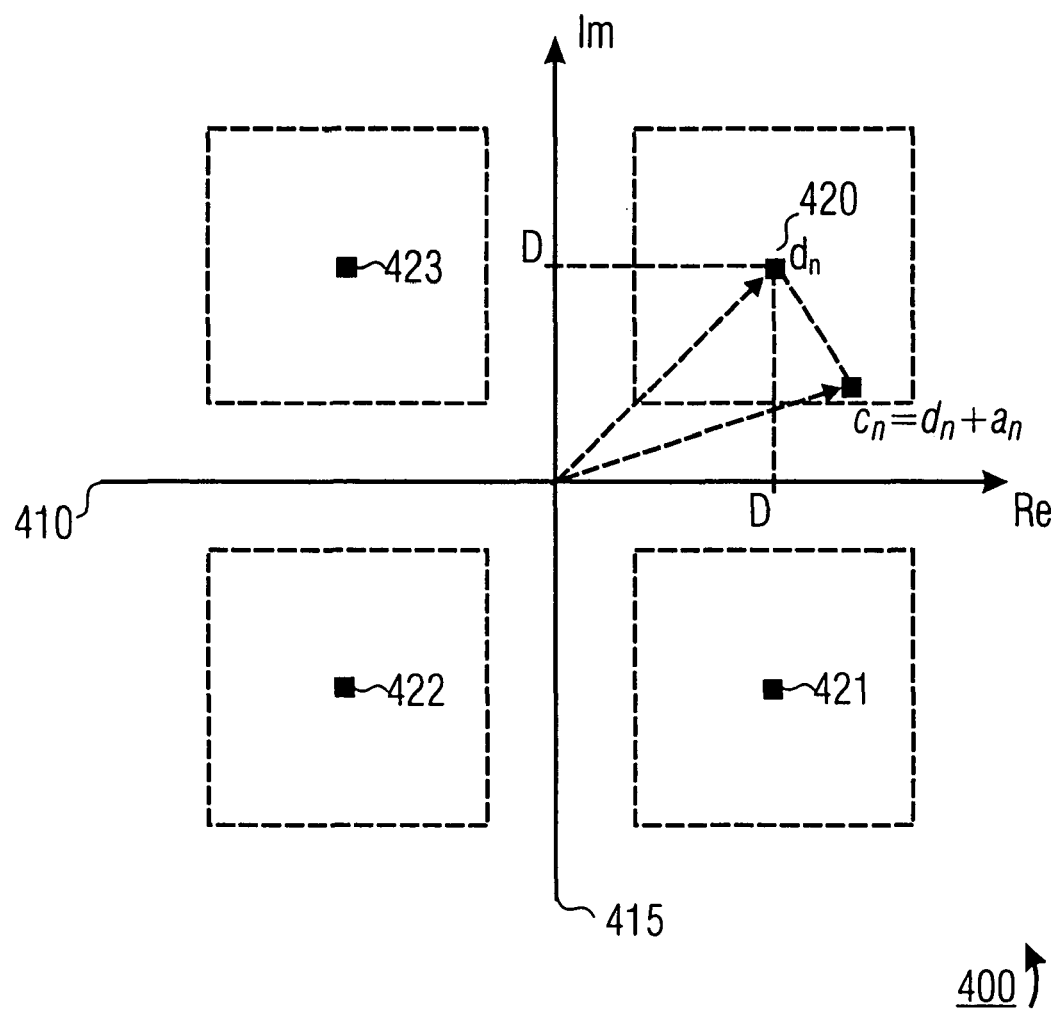
FIG. 4 shows an exemplified constellation diagram for QPSK modulation with rectangular value range regions for the additive signal.

Alternatively, instead of defining circular areas as with the constraint given in equation (8), areas with other shapes are also conceivable. For example, rectangular areas in which the manipulated points or symbols $c_n$ are allowed to lie are illustrated in FIG. 4. FIG. 4 shows another constellation diagram 400 with a real axis 410, an imaginary axis 415, and four modulation symbols 420-423. FIG. 4 shows the four rectangular areas in which the points $c_n$ are allowed to lie as mentioned above.

The optimization problem given in equation (6), together with the constraints given in equations (7) and (8), provides a convex optimization problem of the variables $a_n$, n=0, 1 . . . N−1. Convex optimization has been studied extensively and there are very effective and reliable numerical methods to solve this optimization problem, for example, the interior point method as it is described for example in S. Boyd, Convex Optimization, Cambridge University Press, 2004.

This convex optimization problem has N unknowns and N+1 constraints. The interior point methods can find a solution for such problems in a number of iterations that is almost always in a range between 10 and 100. For each iteration, the complexity is equal to $O(N^2 (N+1))$. In this embodiment of the present invention a particular interior point method, the barrier method is applied. This is an iterative method that transforms the optimization problem with constraints in an unconstrained optimization problem. The resulting unconstrained optimization problem can be solved, for example applying the gradient method.

In details, the function to be minimized is defined as objective function. In this embodiment of the present invention the objective function is the peak-to-average-power-ratio as given in equation (6). The first step is to transform the original inequality constraint problem in an equivalent unconstrained problem. To do this, the inequality constraints of equations (7) and (8) are added to the objective function and the modified objective function is obtained $$\left\{ \frac{\max_{k=0,1,\ldots,N-1} |F_k(d+\tilde{a})|^2}{\frac{1}{N}\|F(d+\tilde{a})\|^2} \right\} + I_-(\|d+\tilde{a}\|^2 - \|d\|^2) + \sum_{i=0}^{N-1} I_-(|\tilde{a}_i| - R), \qquad (9)$$

where $I_-$ is the indicator function defined as $$I_-(u) = \begin{cases} 0 & u \leq 0 \\ \infty & u > 0. \end{cases} \qquad (10)$$

The basic idea of the barrier method is to approximate the indicator function given in equation (10) by the function $$\hat{I}_-(u) = -(1/t)\log(-u) \quad (11),$$

where t>0 is a parameter that determines the accuracy of the approximation. As t increases, the approximation becomes more accurate. Substituting $\hat{I}_-$ for $I_-$ in equation (9) multiplying (9) by t, it is obtained $$t\left\{\frac{\max_{k=0,1,\ldots,N-1}|F_k(d+\tilde{a})|^2}{\frac{1}{N}\|F(d+\tilde{a})\|^2}\right\} - \log(\|d\|^2 - \|d+\tilde{a}\|^2) - \sum_{i=0}^{N-1}\log(R-|\tilde{a}_i|). \quad (12)$$

The new objective function as given in equation (12) can be minimized using for example a gradient method.

A possible drawback of the embodiment of the present invention, which is described above and which is based on the addition of the signal is a degradation in the bit-error-ratio versus the signal-to-noise-ratio performance as, due to the addition of the complex values an, the resulting points $c_n$ do not coincide with the original points $d_n$. The bit-error-ratio degradation is analyzed by Monte-Carlo simulations, which are described in the following.

Figure 5:
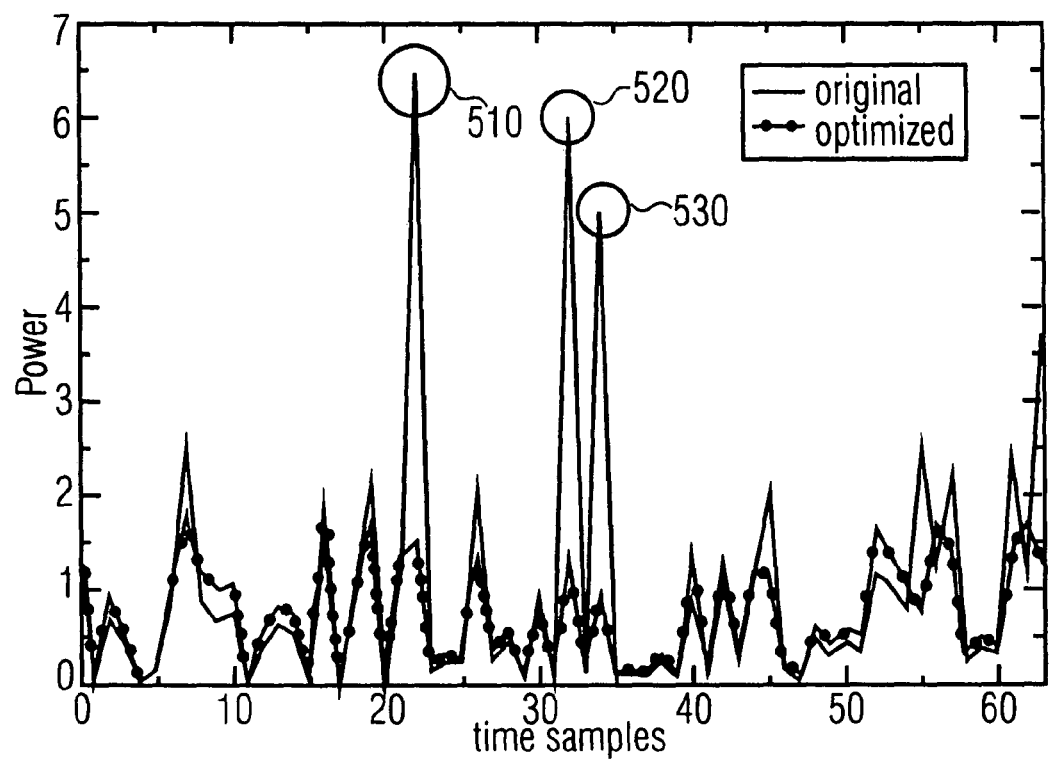
FIG. 5 shows two exemplified time domain signals, before and after adding an inventive peak-to-average-power-ratio reduction signal.

FIG. 5 shows a plot of two OFDM transmission symbols, one in its original version depicted as a straight line and one which was optimized according to the algorithm described above, depicted by a dotted line. Quadrature phase shift keying with Gray mapping modulation is applied and channel coding is not considered. The number of sub-carriers is set to N=64. The radius R is set to 0.5 in FIG. 5. FIG. 5 shows a plot of the power of a typical time domain signal before and after the optimization. The benefits of the inventive methods are clearly visible. Looking at the areas 510, 520, and 530, which are marked in FIG. 5, it can clearly be seen how the peak values are reduced, and therewith the peak-to-average-power ratio.

Figure 6:
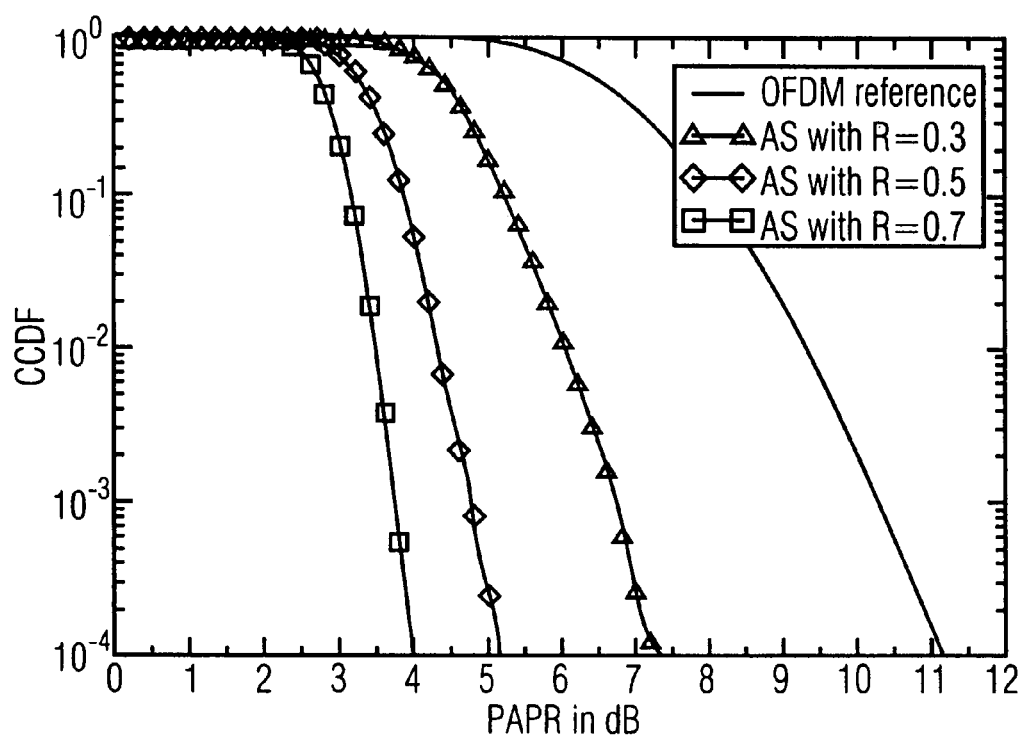
FIG. 6 shows the complementary cumulative distribution function of an exemplified peak-to-average-power-ratio for a conventional OFDM system, and for the proposed additive signal method for different values of radius R.

FIG. 6 presents the results in terms of a complementary cumulative distribution function (CCDF). For the simulations, for which the results are displayed in FIG. 6, the radius R is kept variable. The peak-to-average-power-ratio reduction is averaged over a 100,000 randomly chosen data sequences. The simulation results are given for different radii R. The diagram shown in FIG. 6 shows the complementary cumulative distribution function versus the peak-to-average-power-ratio in dB. Already for a radius of R=0.5, a remarkable average reduction of more than 6 dB is achieved, when considering a ratio of $10^{-3}$ for the CCDF. A further increase of the radius R enables even better suppression. The reason for this lies in the fact that as the radius R grows the constraint from equation (8) becomes looser, therefore allowing more degrees of freedom to find a solution of equation (9).

Figure 7:
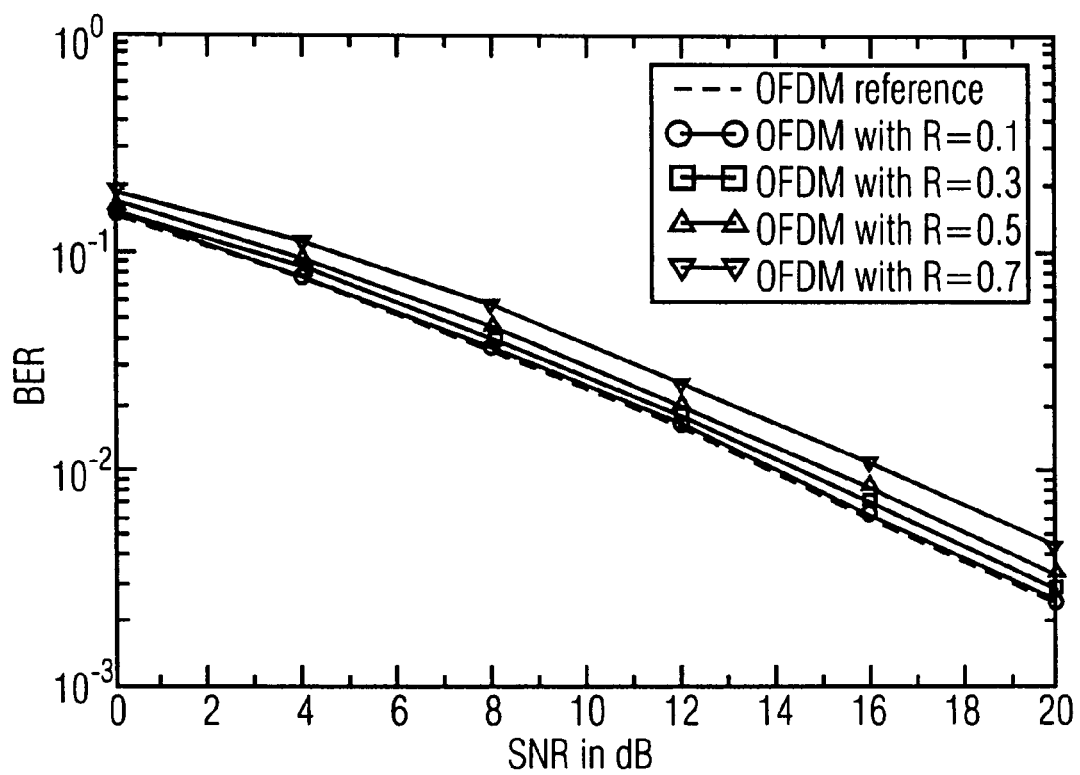
FIG. 7 shows bit-error-ratios versus signal-to-noise-ratios for an OFDM system applying the inventive method, for different radii R, for N=64 sub-carriers, and assuming a Rayleigh fading channel with QPSK modulation.

OFDM systems applying the inventive method of the additive signal with different radii R are compared in FIG. 7 on the basis of bit-error-ratio over signal-to-noise-ratio curves or viewgraphs. In this examination, the signal-to-noise-ratio is given in $E_b/N_0$, which represents the energy per transmission bit over the noise spectral density. Moreover the radio channel is modeled as a frequency selective Rayleigh fading channel, whereas a maximum ratio combining is applied at the receiver assuming perfect channel knowledge. Monte-Carlo simulations are performed taking into account 1,000,000 randomly chosen data sequences. As a reference, the performance of a standard OFDM system without additive signal, i.e. without application of the inventive method is given. As mentioned above, the inventive method of the additive signal results in a bit-error-ratio loss, since the resulting points $c_n$ do not coincide with the original points $d_n$. As it was already described using the FIG. 3, it follows that if R grows, the bit-error-ratio performance further degrades. For example, looking at a bit-error-ratio of BER=$10^{-2}$ and a radius of R=0.5 in FIG. 7, a signal-to-noise-ratio degradation of around 1.2 dB is caused.

The assessment of the FIGS. 6 and 7 reveals that there are two counter acting effects caused by the radius R. Enlarging this radius improves the peak-to-average-power-ratio reduction, but simultaneously leads to a further loss in the signal-to-noise-ratio performance. Therefore, there is a trade-off between the additional peak-to-average-power reduction obtained by enlarging the radius R and the increased loss in signal-to-noise-ratio performance. Setting R=0.5 seems to be a good compromise.

Figure 8:
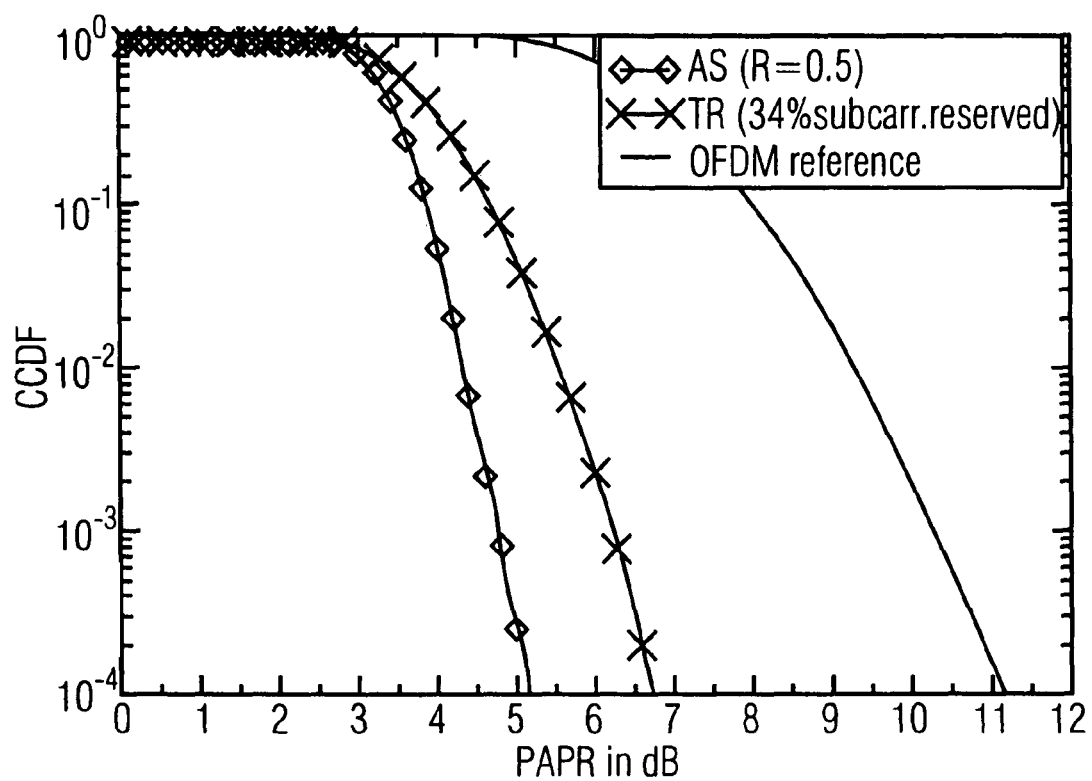
FIG. 8 shows a comparison of an exemplified complementary accumulated distribution function of peak-to-average-power ratios for the inventive additive signal method compared to the state of the art tone reservation method.

FIG. 8 shows a comparison of the inventive method of the additive signal with the tone reservation method. For the inventive method of the additive signal a radius of R=0.5 was assumed and for the tone reservation method 22 out of the 64 sub-carriers were reserved, which leads to a loss of around 34% in spectral efficiency. That set-up leads to approximately the same bit-error-ratio versus signal-to-noise-ratio performance. As it can be seen from FIG. 8, the inventive method of the additive signal exhibits much lower peak-to-average-power ratio. In addition, the inventive approach has higher spectral efficiency as it does not necessitate reservation of the spectral sub-carriers as the tone reservation method does.

The present invention provides the advantage that the peak-to-average-power-ratio especially in OFDM systems and multi-carrier systems can be efficiently reduced, as it was shown utilizing numerical results which have been presented in the FIGS. 5 to 8. Furthermore, the present invention provides the advantage that it can be applied in many systems as for example WLAN, DVB-T, and 4G systems. Comparing the inventive methods to the state of the art approaches, the present invention further provides the advantage that the spectral efficiency of a transmission system can be kept higher while achieving a lower peak-to-average-power-ratio at the same time.

Depending on certain implementation requirements of the inventive method, the inventive method can be implemented in hardware or in software. The implementation can be performed using a digital storage medium, in particular a disk, a DVD, or a CD having an electronically readable control signal stored thereon, which cooperate with a programmable computer system such that the inventive methods are performed. Generally, the present invention is therefore, a computer program product with a program code for a machine-readable carrier, the program code being operative for performing the inventive methods when the computer program runs on a computer. In other words, the inventive methods are therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An adaptation apparatus for adapting an input signal, the input signal being digital in the frequency domain comprising complex modulation symbols and comprising a peak-to-average-power-ratio in the time domain, the adaptation apparatus comprising:

an evaluation unit for evaluating the input signal and for providing an evaluation signal comprising complex symbols based on an optimization criterion comprising a sub-criterion such that the value range of the symbols of the evaluation signal is constrained; and a summing unit for adding the evaluation signal to the input signal in the frequency domain and for providing an output signal in the frequency domain comprising a lower peak-to-average-power-ratio in the time domain than the input signal in the time domain.

2. The adaptation apparatus of claim 1, wherein the input signal is a multicarrier signal, the evaluation unit is adapted for evaluating each of the multicarrier components of the input signal for providing a multicarrier evaluation signal with a component for each multicarrier, and the summing unit is adapted for adding the multicarrier components of the multicarrier evaluation signal and the input signal for providing an output signal with a component for each multicarrier.

3. The adaptation apparatus of claim 2, wherein the input signal is an orthogonal frequency division multiplexing or a discrete multitone signal with a plurality of subcarriers, the evaluation unit is adapted for evaluating each of the subcarriers of the input signal for providing a subcarrier evaluation signal with a component for each subcarrier, and the summing unit is adapted for adding the subcarrier components of the subcarrier evaluation signal and the input signal for providing an output signal with a component for each subcarrier.

4. The adaptation apparatus of claim 1, wherein the input signal comprises a complex representation of a base band signal;

the evaluation unit is adapted for providing a complex evaluation signal; and the summing unit is adapted for adding the complex evaluation signal to the input signal.

5. The adaptation apparatus of claim 1, wherein the input signal comprises a complex representation of modulation symbols of a phase shift keying or a quadrature amplitude modulation symbol alphabet and the summing unit is adapted for adding the evaluation signal to the complex representation of modulation symbols of a phase shift keying or a quadrature amplitude modulation symbol alphabet.

6. The adaptation apparatus of claim 1, wherein the evaluation unit is adapted for providing the evaluation signal based on a convex optimization algorithm.

7. The adaptation apparatus of claim 1, wherein the evaluation unit is adapted for providing the evaluation signal according to an optimization criterion including constraints on a transmission power or a bit-error-rate performance.

8. The adaptation apparatus of claim 1, wherein the evaluation unit is adapted for providing the evaluation signal according to an optimization criterion comprising a sub-criterion such that the power of an output signal is less or equal to a power of the input signal.

9. The adaptation apparatus of claim 1, wherein the evaluation unit is adapted for providing the evaluation signal according to an optimization criterion comprising a sub-criterion such that the magnitudes of the symbols of the evaluation signals are constrained.

10. The adaptation apparatus of claim 1, wherein the evaluation unit is adapted for providing the evaluation signal based on an interior point method, a barrier method or a gradient method.

11. A method for adapting an input signal, the input signal being digital in the frequency domain comprising complex modulation symbols and comprising a peak-to-average-ratio in the time domain, comprising:

evaluating the input signal and providing an evaluation signal comprising complex symbols based on an optimization criterion comprising a sub-criterion such that the value range of the symbols of the evaluation signal is constrained;

adding the evaluation signal to the input signal in the frequency domain; and providing an output signal in the frequency domain comprising a lower peak-to-average-power-ratio in the time domain than the input signal in the time domain.

12. A computer program stored on a tangible computer readable storage medium, comprising a program code executed by a processor for performing a method for adapting an input signal, the input signal being digital in the frequency domain comprising complex modulation symbols and comprising a peak-to-average-ratio in the time domain, comprising:

evaluating the input signal and providing an evaluation signal comprising complex symbols based on an optimization criterion comprising a sub-criterion such that the value range of the symbols of the evaluation signal is constrained;

adding the evaluation signal to the input signal in the frequency domain; and providing an output signal in the frequency domain comprising a lower peak-to-average-power-ratio in the time domain than the input signal in the time domain, when a program code runs on a computer.

* * * * *